United States Patent
Banatwala et al.

(10) Patent No.: US 9,515,950 B2
(45) Date of Patent: *Dec. 6, 2016

(54) MULTI-TENANCY SUPPORT FOR ENTERPRISE SOCIAL BUSINESS COMPUTING

(71) Applicant: International Business Machines Corporation, Armonk, NY (US)

(72) Inventors: Mustansir Banatwala, Hudson, NH (US); David A. Brooks, Arlington, MA (US); Patrick Y. Lin, Lexington, MA (US); Thomas Schaeck, Achern (DE); Robert L. Yates, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 212 days.

This patent is subject to a terminal disclaimer.

(21) Appl. No.: 14/080,381

(22) Filed: Nov. 14, 2013

(65) Prior Publication Data

US 2014/0280583 A1    Sep. 18, 2014

Related U.S. Application Data

(63) Continuation of application No. 13/841,258, filed on Mar. 15, 2013.

(51) Int. Cl.
  *H04L 12/911* (2013.01)
  *H04L 29/06* (2006.01)
  *H04L 29/08* (2006.01)

(52) U.S. Cl.
  CPC .......... *H04L 47/70* (2013.01); *H04L 63/0227* (2013.01); *H04L 63/10* (2013.01); *H04L 63/20* (2013.01); *H04L 67/306* (2013.01)

(58) Field of Classification Search
  CPC ....... H04L 47/70; H04L 63/10; H04L 63/20; H04L 63/0227; H04L 67/306
  See application file for complete search history.

(56) References Cited

U.S. PATENT DOCUMENTS 8,271,536 B2   9/2012  Amradkar et al.
8,291,490 B1  10/2012  Ahmed et al.
(Continued)

FOREIGN PATENT DOCUMENTS

WO   2012004185   1/2012

OTHER PUBLICATIONS

U.S. Office Action dated Aug. 31, 2015 issued in U.S. Appl. No. 13/841,258.
(Continued)

*Primary Examiner* — Patrice Winder
*Assistant Examiner* — Angela Widhalm De Rodrig
(74) *Attorney, Agent, or Firm* — Scully, Scott, Murphy & Presser, P.C.; Dermott Cooke

(57) ABSTRACT

Mechanisms are provided for enabling collaboration across tenants in a multi-tenant environment using single sign-on (SSO) authentication/authorization. Various examples provide for creating a user account and provisioning a subscription to a user (e.g., to enable single sign-on authentication/authorization). The user is allowed to access services (e.g., collaborative services) in a multi-tenant environment by utilizing a subscription authorization of the user without prompting the user to authenticate by logging-in again (that is, without prompting the user to log-in again after the user has already logged-in and been authenticated for a given session). Other examples provide for mapping webspaces through URL hosts where each organization (that is, tenant) has its own set of namespace(s).

10 Claims, 12 Drawing Sheets

(56) References Cited

U.S. PATENT DOCUMENTS

| | | |
|---|---|---|
| 8,554,694 B1 | 10/2013 | Ward et al. |
| 8,782,748 B2 | 7/2014 | Olszewski et al. |
| 2003/0159072 A1 | 8/2003 | Bellinger et al. |
| 2007/0038931 A1 | 2/2007 | Allaire et al. |
| 2009/0024609 A1 | 1/2009 | Barker et al. |
| 2009/0249439 A1 | 10/2009 | Olden et al. |
| 2009/0249440 A1 | 10/2009 | Platt et al. |
| 2011/0231919 A1 | 9/2011 | Vangpat et al. |
| 2012/0060108 A1 | 3/2012 | Domartini |
| 2012/0089610 A1 | 4/2012 | Agrawal et al. |
| 2012/0221709 A1 | 8/2012 | Bowes et al. |
| 2012/0331016 A1 | 12/2012 | Janson et al. |
| 2013/0066770 A1 | 3/2013 | Das et al. |
| 2013/0066945 A1 | 3/2013 | Das et al. |
| 2013/0144945 A1 | 6/2013 | Said et al. |
| 2013/0174275 A1 | 7/2013 | Micucci et al. |
| 2013/0227479 A1 | 8/2013 | Ramsey et al. |
| 2014/0058945 A1 | 2/2014 | Stecher |
| 2014/0075016 A1 | 3/2014 | Chatterjee et al. |
| 2014/0180915 A1 | 6/2014 | Montulli et al. |

OTHER PUBLICATIONS

International Search Report together with the Written Opinion of the International Searching Authority dated Jun. 11, 2014 from International Application No. PCT/IB2014/058967.

U.S. Office Action dated Feb. 13, 2015 issued in U.S. Appl. No. 13/841,258.

```
objectClass ( 1.3.18.0.2.6.701
    NAME 'ibm_saasUserAccount'
    DESC 'IBM Connections User Account Object'
    AUXILIARY
    MUST ( ibm-saasUserAccountId $ uid )
    MAY ( ibm-saasMultiTenancyId $
    ibm-saasPrimaryOrganizationId ) )
```

FIG. 2A objectclass:inetorgperson
objectclass: ibm-saas
UserAccount (aux.)
ID: user's GUID
071a01da-864c-1030-
8856-f5f8f2a026a9
UID: jsmith
primaryOrgID:
91ad3d12-864c-1030-
8c27-f5f8f2a026a9,
multitenancyID:
91ad3d12-864c-1030-
8c27-f5f8f2a026a9,
06f9b628-864c-1030-
8855-f5f8f2a026a9

FIG. 2B objectclass:inetorgperson
objectclass: ibm-saas
UserSubscription (aux.)
ID: subscriber's GUID
06d922fa-864c-1030-
8854-f58f2a026a9
user's GUID
071a01da-864c-1030-
8856-f58f2a026a9
organization's GUID
multitenancyID:
91ad3d12-864c-1030-
8c27-f58f2a026a9,
role: regular employee

FIG. 2C

```
objectclass:organization
objectclass: ibm-saas
  Organization (aux.)
cn: bankABC
ID: organization's GUID
  91ad3d12-864c-1030-
  8c27-f5f8f2a026a9,
URL: organization's URL
  www.bankABC.com
```

FIG. 2D objectclass: inetorgperson
objectclass: ibm-saas
UserSubscription (aux.)
ID: subscriber's GUID
   91ad3d12-864c-1030-
   8c27-f5f8f2a026a9,
user's GUID
   071a01da-864c-1030-
   8856-f5f8f2a026a9
organization's GUID
   06f9b628-864c-1030-
   8855-f5f8f2a026a9
role: special agent

FIG. 2E

```
objectclass: organization
objectclass: ibm-saas
   Organization (aux.)
cn: bankXYZ
ID: organization's GUID
   06f9b628-864c-1030-
   8855-f5f8f2a026a9
URL: organization's URL
   www.bankXYZ.com
```

FIG. 2F

```
objectClass ( 1.3.18.0.2.6.702
    NAME 'ibm_saasUserSubscription'
    DESC 'IBM Connections User Subscription Object'
    AUXILIARY
    MUST ( ibm-saasUserSubscriptionId $
           ibm-saasUserAccountId $
           ibm-saasOrganizationId )
    MAY ibm-saasSubscribedRole )
```

FIG. 2G

```
objectClass ( 1.3.18.0.2.6.704
  NAME 'ibm_saasOrganization'
  DESC 'IBM Connections Organization Object'
  AUXILIARY
  MUST ibm-saasOrganizationId
  MAY ibm-saasOrganizationURLHost )
```

FIG. 2H

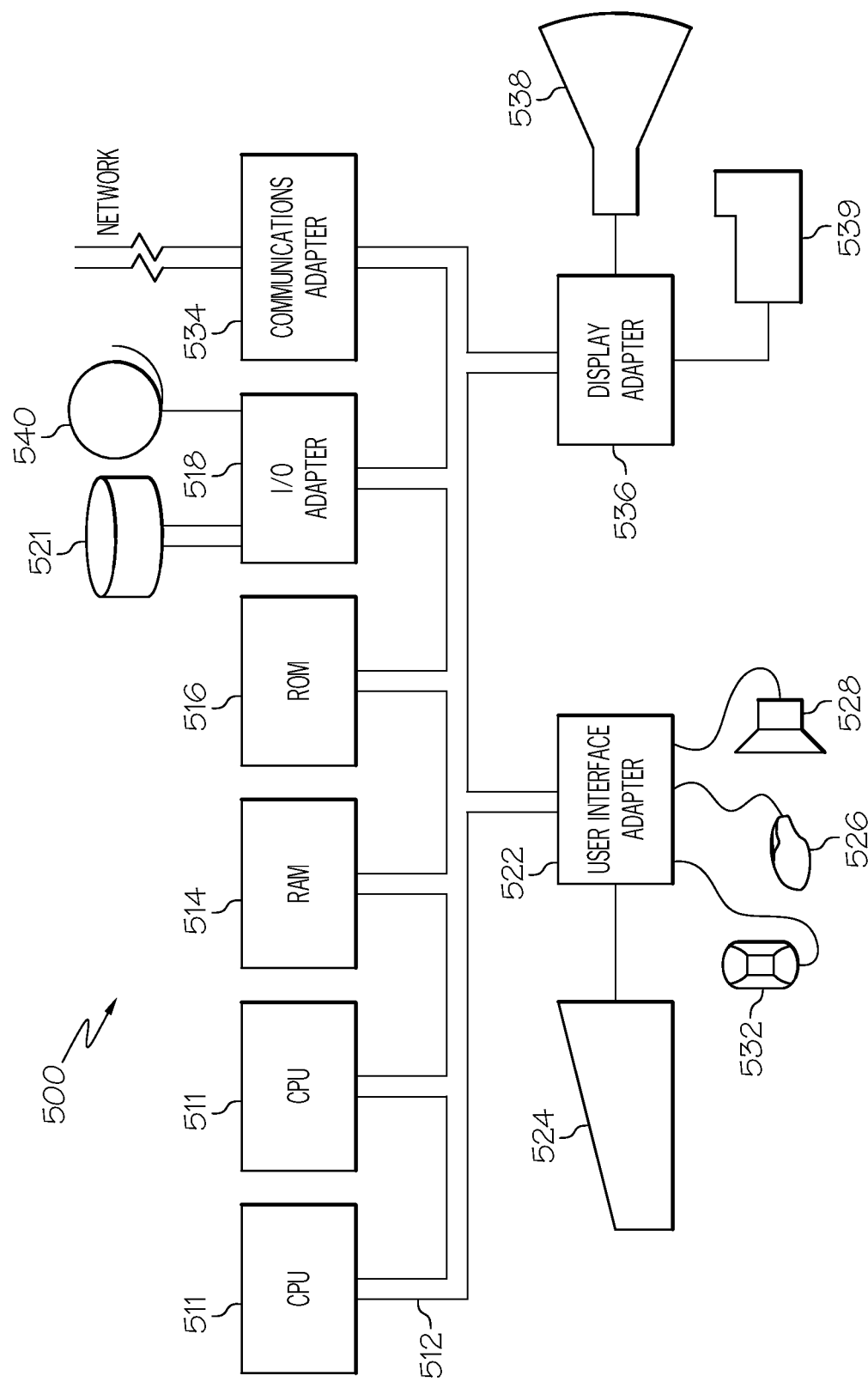

MULTI-TENANCY SUPPORT FOR ENTERPRISE SOCIAL BUSINESS COMPUTING

RELATED APPLICATION

This application is a continuation of U.S. application Ser. No. 13/841,258, filed Mar. 15, 2013, the entire contents of which are incorporated herein by reference.

BACKGROUND

The present disclosure relates generally to the field of multi-tenancy support for enterprise social business computing.

Conventionally, all participants across multiple organizations cannot typically be adequately socially networked together. Further, user account life cycle across multiple tenants cannot typically be efficiently and effectively managed.

SUMMARY

In various embodiments, methodologies may be provided that enable multi-tenancy support for enterprise social business computing.

In one embodiment, a method for enabling at least a first user to utilize a multi-tenant computing environment, wherein the multi-tenant computing environment comprises at least a first computing resource associated with a first tenant and a second computing resource associated with a second tenant is provided, the method comprising: assigning, by a processor, a first user account to the first user, wherein the first user account has associated therewith first user account information comprising at least one user account indicium that is unique across the multi-tenant computing environment; linking by the processor, to the first user account, a first subscription, wherein the first subscription has associated therewith first subscription information; linking by the processor, to the first user account, a second subscription, wherein the second subscription has associated therewith second subscription information; receiving from the first user, by the processor, at least the user account indicium in connection with a log-in to the multi-tenant computing environment by the first user; permitting, by the processor, access to the first computing resource for the first user account based upon the log-in with the user account indicium and the first subscription information of the first subscription that is linked to the first user account; and permitting, by the processor, access to the second computing resource for the first user account based upon the log-in with the user account indicium and the second subscription information of the second subscription that is linked to the first user account.

In another embodiment, a computer readable storage medium, tangibly embodying a program of instructions executable by the computer for enabling at least a first user to utilize a multi-tenant computing environment, wherein the multi-tenant computing environment comprises at least a first computing resource associated with a first tenant and a second computing resource associated with a second tenant is provided, the program of instructions, when executing, performing the following steps: assigning a first user account to the first user, wherein the first user account has associated therewith first user account information comprising at least one user account indicium that is unique across the multi-tenant computing environment; linking to the first user account a first subscription, wherein the first subscription has associated therewith first subscription information; linking to the first user account a second subscription, wherein the second subscription has associated therewith second subscription information; receiving from the first user at least the user account indicium in connection with a log-in to the multi-tenant computing environment by the first user; permitting access to the first computing resource for the first user account based upon the log-in with the user account indicium and the first subscription information of the first subscription that is linked to the first user account; and permitting access to the second computing resource for the first user account based upon the log-in with the user account indicium and the second subscription information of the second subscription that is linked to the first user account.

In another embodiment, a system for enabling at least a first user to utilize a multi-tenant computing environment, wherein the multi-tenant computing environment comprises at least a first computing resource associated with a first tenant and a second computing resource associated with a second tenant is provided, the system comprising: an assigning element configured to assign a first user account to the first user, wherein the first user account has associated therewith first user account information comprising at least one user account indicium that is unique across the multi-tenant computing environment; a first linking element configured to link, to the first user account, a first subscription, wherein the first subscription has associated therewith first subscription information; a second linking element configured to link, to the first user account, a second subscription, wherein the second subscription has associated therewith second subscription information; a receiving element configured to receive from the first user at least the user account indicium in connection with a log-in to the multi-tenant computing environment by the first user; a first permitting element configured to permit access to the first computing resource for the first user account based upon the log-in with the user account indicium and the first subscription information of the first subscription that is linked to the first user account; and a second permitting element configured to permit access to the second computing resource for the first user account based upon the log-in with the user account indicium and the second subscription information of the second subscription that is linked to the first user account.

BRIEF DESCRIPTION OF THE DRAWINGS

Various objects, features and advantages of the present invention will become apparent to one skilled in the art, in view of the following detailed description taken in combination with the attached drawings, in which:

FIGS. 2A-2H depict diagrams of data structure definitions related to various nodes of the diagram of FIG. 1.

FIG. 5 depicts a block diagram of a system according to an embodiment of the present invention.

DETAILED DESCRIPTION

Figure 1:
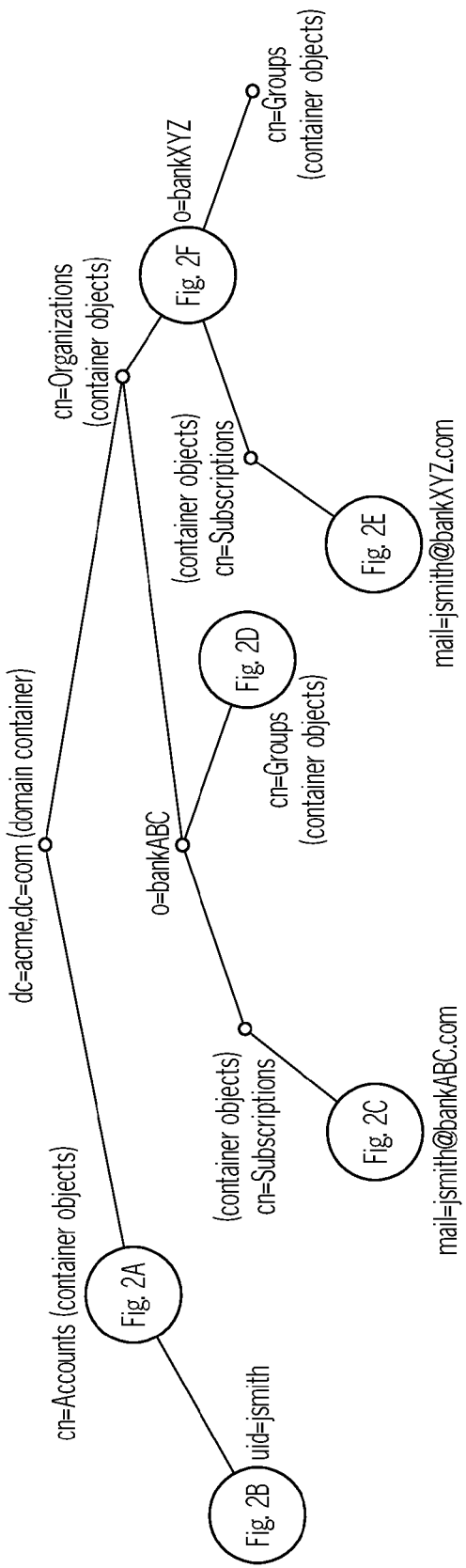
FIG. 1 depicts a diagram of an example reference implementation of light weight directory access protocol (LDAP), data information tree (DIT) and schema according to an embodiment of the present invention.

In various embodiments, methodologies may be provided that enable multi-tenancy support for enterprise social business computing.

In various examples, multi-tenancy support for enterprise social business computing may be implemented in the form of systems, methods and/or algorithms.

In other examples, mechanisms are provided for enabling support across tenants in a multi-tenant environment using single sign-on authentication/authorization.

In other examples, mechanisms are provided for enabling collaboration by users across tenants in a multi-tenant environment.

In the present disclosure, the term "tenant" refers to an organization (for example, a corporate entity).

In the present disclosure, the term "multi-tenant environment" refers to a computing environment (e.g., comprising one or more servers) hosting at least one computer presence of a first tenant and at least one computer presence of a second tenant (wherein the first and second tenants are distinct from one another). In one specific example, a multi-tenant environment may host, for each of a plurality of tenants, a respective web presence.

In the present disclosure, the term "hosting a computer presence" refers to the presence of computing power to sustain and carry out calculations in connection with social business applications.

In the present disclosure, the term "web space" refers to a cloud based web presence defined by a URL.

In the present disclosure, the term "computing resource" refers to data and/or applications available in a multi-tenant computing environment. In various specific examples, such a computing resource may comprise a web presence, a website and/or web page(s). In other specific examples, such a web presence may comprise data (e.g., analytic data) contributed by people socially networking together.

In the present disclosure, the term "subscription information" refers to data defining a valid relationship established between a user (e.g., an end-user) and a tenant. In one specific example, such subscription information may be used to provide a subscriber access to (and the ability to network socially within) one or more tenant boundaries.

In the present disclosure, the term "primary subscription" refers to a subscription for a user (e.g., an end-user) to the original (or the "first") organization to which this user belongs.

In the present disclosure, the term "secondary subscription" refers to a subscription for a user (e.g., an end-user) to a later (or a "subsequent") organization to which this user belongs (that is, subsequent to the primary subscription).

As described herein, mechanisms are provided for enabling a multi-tenant environment using single sign-on (SSO) authentication/authorization. In one specific example, mechanisms are provided for enabling collaboration across tenants in a multi-tenant environment using single sign-on authentication/authorization. In another specific example, mechanisms are provided for creating a user account and provisioning one or more subscriptions to the user (e.g., to enable single sign-on authentication/authorization). In another specific example, mechanisms are provided to allow a user to access collaborative services in a multi-tenant environment by utilizing a subscription authorization of the user without prompting the user to authenticate by logging-in again (that is, after initially logging-in and being authenticated for a given session). In another specific example, mechanisms are provided for mapping webspaces through uniform resource locator (URL) hosts (e.g., where each organization (that is, tenant) as its own set of namespaces).

Of note, there are generally only a few methods in which a conventional multi-tenant environment can provide secure access to an organization's content. Segregation of content and user base can be achieved by either appropriately protecting the data model at the various levels of the stack or, alternatively at the extreme end, by providing an organization with their own deployment.

On the one hand, if the type of cloud architecture chosen is that a user base is centrally registered, it is conventionally not easily possible for the users to collaborate across organizational boundaries.

On the other hand, if the type of cloud architecture chosen is that a user base is not centrally registered, it conventionally results in either a given user's authentication credentials being replicated into the various organizations (which may lead to difficulties in identity management and trust of user/identity) or makes the user lifecycle management extremely difficult.

Thus, as described herein, various mechanisms are provided where a central user repository can be effectively managed to resolve issues of user identity and lifecycle. In one example, policy objects can be stored at an organization level and/or a user level to allow a given organization's users to invite users from other organization into their collaboration space (such users from other organization may hereinafter be referred to as "out of organization users"). In another example, provision is provided to maintain roles related to users (e.g., wherein such roles can be queried and/or enforced by various services to better control/define the rights the users have (e.g., the out of organization users have). In other examples, the mechanisms for treating a user can make handling administration, user lifecycle issues, and content ownership issues easier as well.

Reference will now be made to an embodiment which differentiates a user account from a user subscription. In this embodiment, a user account is used for authentication, while a user subscription is used for authorization. In one example, one single user account may be associated with multiple user subscriptions and each subscription may be applicable for a web space of a given organization (that is, a given tenant in a multi-tenant environment). Therefore, in this example, a single user account may be able to socially participate in a web space of each of a plurality of organizations (that is, tenants), without logging-in and logging-out multiple times.

In one specific example, a multi-tenant environment can be virtually mapped with multiple web spaces through uniform resource locator (URL) hosts. All the participating organizations (that is, tenants) can own (or otherwise be associated with) multiple unique name spaces. Those namespaces can be uniquely identified when an end-user moves around and goes beyond the original organizational namespaces where the user had logged-in in the first place (e.g., for a given session). For the purposes of this disclosure, what is meant by moves around and goes beyond the original organizational namespaces is when the same person logged into one web space, and would like to move across the current tenant and go into another—in this example, this user will be checked against his subscription from account information to allow or deny his movement.

All valid user subscriptions (for a given user account) can be retrieved through link(s) associated with the given user account (which can be recognized, for example, based upon the organizational namespace and subscriber's associated organization identifier). User subscription data can then be used to authorize a given user to access (e.g., securely access) protected web resources within a given organizational boundary.

In another example, provisioning of user accounts and/or granting subscriptions may be made through invitation. In another example, a user account may be provisioned with one subscription per tenant. In this example, only end-users with valid subscriptions are permitted to access given tenants.

In one specific example, user subscriptions can be granted through invitation by organizational system administrators and user accounts can be provisioned by system-wide administrators. This provision process may be used to manage, to activate, to inactivate and/or to terminate user accounts and users subscription in two different levels as discussed in more detail below (for example, user accounts may be administered independently of users subscriptions).

In one specific example, a user account may be administered in a manner which impacts all associated user subscriptions. For example, once a given user account is inactivated, all subscriptions associated with the given user account cannot be used to access any web namespaces at all (since the authentication process for this given user account should fail). For the purposes of this disclosure, two example namespaces are https://bankXYZ.connections.com/homepage vs https://bankABC.connections.com/homepage.

In another example, a given user account can be reactivated, and all the previously stored user application data will again be available to this account. In another example, a given user account may be terminated, which may cause all associated user application data to be collected and deleted.

Reference will now be made to an embodiment which administers a user subscription for a given organization (e.g., directly). In one specific example, a user subscription can be managed to be activated, inactivated and/or terminated for a given organization. In this example, such actions will not affect other valid subscriptions for the same user account.

Reference will now be made to an embodiment in which implementation is through a central component (e.g., without impacting existing applications). In one specific example, various multi-tenancy support described herein can be done throughout an abstract layer. In this example, all existing applications can be kept in one single code base. This abstract layer may then be used to provide subscribers organizational and web based applications.

Referring now to FIGS. 1 and 2A-2H, reference will now be made to an example implementation via light weight directory access protocol, data information tree and schema (this example depicts how the organizational structure with user account and subscription can be implemented using LDAP services). In one example, "WALTZ" is a reference implementation in an API. Applications that run atop this social business platform may rely on this API to know whether a given end-user (who) can be allowed to access what web space (where) with more details of profiles (what). In one specific example, WALTZ recognizes uid=jsmith (who are you") and www.bankABC.com (where do you want to go?) in order to return back ID, role, mail, etc.

More particularly, as seen in FIG. 1, there are the following example interconnected nodes: node A (see FIG. 2A for details of the set of attributes at this node); node B (see FIG. 2B for details of the set of attributes at this node); node C (see FIG. 2C for details of the set of attributes at this node); node D (see FIG. 2D for details of the set of attributes at this node); node E (see FIG. 2E for details of the set of attributes at this node); and node F (see FIG. 2F for details of the set of attributes at this node).

Figure 3:
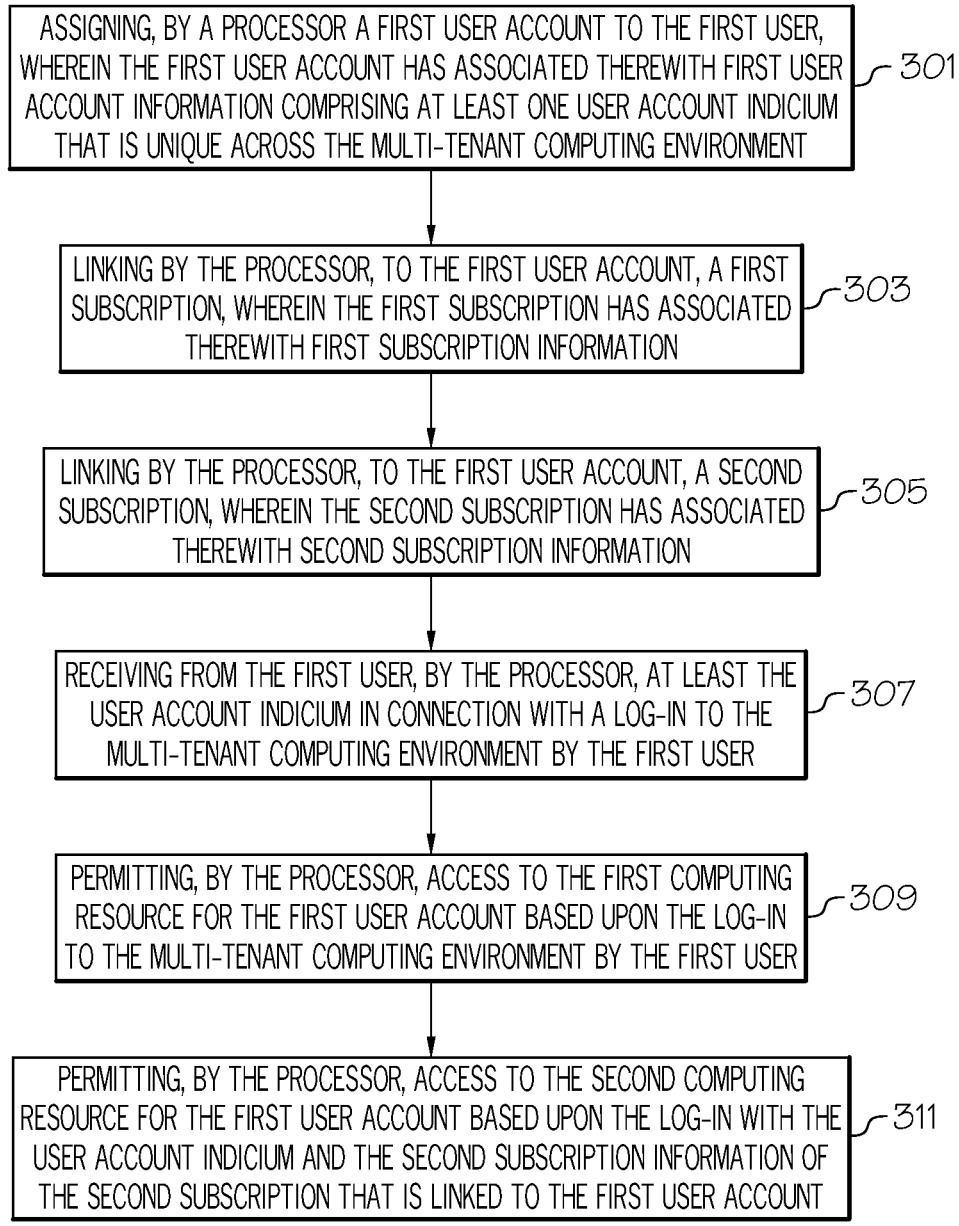
FIG. 3 depicts a flowchart of a method according to an embodiment of the present invention.

Referring now to FIG. 3, a method for enabling at least a first user to utilize a multi-tenant computing environment, wherein the multi-tenant computing environment comprises at least a first computing resource associated with a first tenant and a second computing resource associated with a second tenant is shown. As seen in this FIG. 3, the method of this embodiment comprises: at 301—assigning, by a processor, a first user account to the first user, wherein the first user account has associated therewith first user account information comprising at least one user account indicium that is unique across the multi-tenant computing environment; at 303—linking by the processor, to the first user account, a first subscription, wherein the first subscription has associated therewith first subscription information; at 305—linking by the processor, to the first user account, a second subscription, wherein the second subscription has associated therewith second subscription information; at 307—receiving from the first user, by the processor, at least the user account indicium in connection with a log-in to the multi-tenant computing environment by the first user; at 309—permitting, by the processor, access to the first computing resource for the first user account based upon the log-in with the user account indicium and the first subscription information of the first subscription that is linked to the first user account; and at 311—permitting, by the processor, access to the second computing resource for the first user account based upon the log-in with the user account indicium and the second subscription information of the second subscription that is linked to the first user account.

In one example, any steps may be carried out in the order recited or the steps may be carried out in another order.

Figure 4:
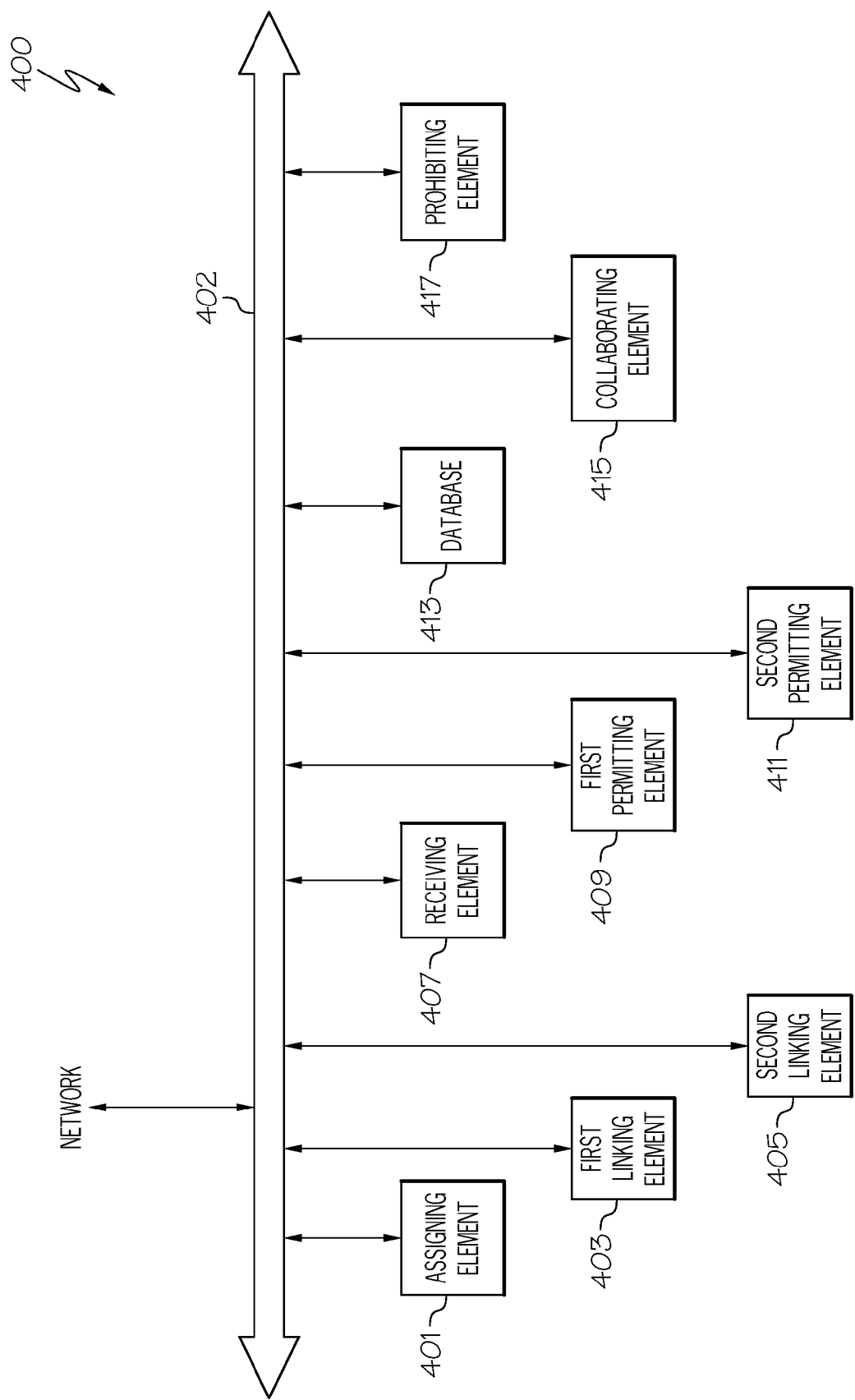
FIG. 4 depicts a block diagram of a system according to an embodiment of the present invention.

Referring now to FIG. 4, in another embodiment, a system 400 is provided. This system is for enabling at least a first user to utilize a multi-tenant computing environment, wherein the multi-tenant computing environment comprises at least a first computing resource associated with a first tenant and a second computing resource associated with a second tenant. This system may include the following elements: an assigning element 401 configured to assign a first user account to the first user, wherein the first user account has associated therewith first user account information comprising at least one user account indicium that is unique across the multi-tenant computing environment; a first linking element 403 configured to link, to the first user account, a first subscription, wherein the first subscription has associated therewith first subscription information; a second linking element 405 configured to link, to the first user account, a second subscription, wherein the second subscription has associated therewith second subscription information; a receiving element 407 configured to receive from the first user at least the user account indicium in connection with a log-in to the multi-tenant computing environment by the first user; a first permitting element 409 configured to permit access to the first computing resource for the first user account based upon the log-in with the user account indicium and the first subscription information of the first subscription that is linked to the first user account; a second permitting element 411 configured to permit access to the second computing resource for the first user account based upon the log-in with the user account indicium and the second subscription information of the second subscription that is linked to the first user account; a database 413 that stores data to link the first subscription and the second subscription to the first user account; and a collaborating element 415 configured to enable, after the log-in by the first user, collaboration by the first user with at least a second user in connection with access to at least one of the first computing resource and the second computing resource.

Further, in one example, the multi-tenant computing environment comprises at least a third computing resource associated with a third tenant; and the system further comprises a prohibiting element 417 configured to prohibit access to the third computing resource for the first user.

Each of the above elements/components may be operatively connected together via system bus 402. In one example, communication between and among the various elements/components may be bi-directional. In another example, the communication may be carried out via the Internet, an intranet, a local area network, a wide area network and/or any other desired communication channel(s). In another example, some or all of these elements/components may be implemented in a computer system of the type shown in FIG. 5.

In one example, the tree structure of FIG. 1 and the object classes function in connection with operation of an embodiment as follows: A subscriber object, for the authN (authentication) process, is always associated with an account, for the authZ (authorization) process. Once authZ is done, there will be no need for the same user to be authN again. Account object comprises a list of subscription objects. This list of subscription for the same account will be used to determine whether or not this account can move around to different tenants. Each subscription is associated with its own web space. When a user, through account and subscriptions, moves around, the permissible web space will accommodate his/her movement.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an intranet, a local area network (LAN), etc., and a display adapter 536 for connecting the bus 512 to a display device 538 and/or printer 539 (e.g., a digital printer or the like).

Of note, while various figures may show various entities communicating, it is to be understood that the figures are actually referring to communication by computer system(s) or the like that are owned, leased, operated, used by, in the possession of, and/or controlled by each of the entities.

As described herein, mechanisms are provided for collaboration by users across tenants with (for a given user) a single user sign-on accessing subscription multi-tenancy based services, comprising: utilizing at least one user cookie for accessing subscription based services across a multi-tenancy environment without being prompted for log-in again (that is, without being prompted to log-in again after being authenticated in connection with a first log-in of a given session). In this example, "cookie" here refers to SSO security cookies, which should only be granted once user accounts can be successfully authenticated. This same user cookie will then be leveraged to go across and beyond the original web space supplied by the original tenant that he/she may have logged on in the first place.

In another example, various embodiments may utilize all or part of a conventional WEBSPHERE (IBM Corporation, Armonk, N.Y.) mechanism/protocol for security authentication/SSO that takes advantage of LTPA (lightweight third-party authentication protocol) cookies (a mechanism for SSO). However, some customers may apply 3rd parties' security proxy, which will combine multiple cookies into the final web based traffic.

In one example, a subscription authorization may be granted by invitation. In one specific example of such invitation, an account for John Smith, who is working for Company A, can access social web space provided by Company A originally. When John Smith is working on a project, which may require collaboration with 3rd parties such as Company B, then if Company B system administrators grant John Smith a subscription, he will be allowed to access social space of both.

In another example, a subscription authorization may be utilized to access collaborative services.

In another example, a single user account may be entitled to be socially served. In one specific example of socially served, a person may participate in many social applications services.

In another example, a user of a single user account may be connected with different set(s) of colleagues going beyond corporate boundaries (e.g., so that John Smith, can be socially connected with both Company A and Company B).

In another example, mechanisms may be provided for mapping web spaces through URL hosts (e.g., wherein each organization has its own set of name spaces).

In another example, subscriptions may be managed for a collaborative service by an administrator carrying out authorization of the collaborative service.

In another example, a user account may be managed by a system administrator (which could be for the organization creating the user account).

As described herein, various embodiments may operate in the context of: social software; social computing; collaboration and communications; and/or a social business framework.

As described herein, various embodiments may operate in the context of: Cloud: Delivery model: Software as a Service (SaaS); Cloud: Enabling technology: Multi-tenancy; Consumer Device or Appliance: Web; Converged Communications: Mobile applications; IT Services: Business and IT consulting; Software: Application development software; Software: Application server middleware; Software: Collaborative applications; and/or Web Technology: Content management and use.

In another example, a system administrator or the like can add and/or delete tenants to which a given user is allowed access.

In another example, a system administrator or the like can control many accounts and many applications via the "cloud".

As described herein, various mechanisms provide for subscription-oriented "cloud" based software-as-a-service (SaaS) with multi-tenancy support for enterprise social networking business.

As described herein, mechanisms are provided to administer (in a secure, controlled and administratively effective manner) a given user in a multi-tenant environment (e.g., wherein the given user is registered as a user of one or more tenants or as a guest to the multi-tenant environment).

As described herein, mechanisms are provided to utilize (in a secure, controlled and administratively effective manner) a single registration of a first user (associated with a first organization) in a multi-tenant environment to enable the first user to participate in collaboration (e.g., content sharing) with one or more other users associated with one or more other organizations.

As described herein, in various embodiments all participants across multiple organizations can be adequately socially networked together. Further, in various embodiments user account life cycle across multiple tenants can be efficiently and effectively managed.

As described herein, in various embodiments there is provided a satisfactory invitation model that can go beyond organizational boundaries and a satisfactory single sign-on authentication/authorization model that can go beyond organizational boundaries. Thus, under these embodiments an end-user can perform a single sign-on to access a respective computer presence (to which the end-user has been allowed access via subscription) for each of a plurality of tenants.

As described herein, various examples may operate using authentication first (e.g., for log-in) followed by authorization (e.g., based on subscription(s)).

As described herein, various examples may provide for socially connecting between/among users. In one specific example, users may share applications and/or files and/or blogs (assuming each user has a valid subscription).

As described herein, various embodiments may provide for collaboration across some or all participating tenants. In one specific example, in a multi-tenant offering cross-tenant collaboration can be seamlessly enabled. In another specific example, users can be enabled to easily work across organizational (e.g., tenant) boundaries. Further, such users can be enabled to invite (and/or via an administrator registering) others into an organizational (e.g., tenant) web presence. Further, mechanisms may be provided related to user policies (e.g., mechanisms may be provided control user behavior).

As described herein, various examples may operate such that all participants across multiple organizations are able to single sign-on for access to the multiple tenants (that is, a given end-user may be granted access (e.g., based on subscription), without being prompted again for authentication).

As described herein, various examples may operate to manage account life cycles (e.g., across multiple tenants). In one specific example, each participant may be managed (e.g., by an administrator) to have activated, inactivated, and/or terminated each of his subscriptions related to access to multiple organizational web spaces.

As described herein, various examples may operate by relying more on an authorization process rather than adding too much burden based on authentication. In one specific example, one or more security cookies and/or certificates may be utilized.

As described herein, various examples may utilize an operational model that is lightweight.

As described herein, various examples may utilize tenanted resources that are bound to Web URL namespaces.

As described herein, a given user can have multiple subscriptions (e.g., one for each of a plurality of tenants). In one specific example, the subscriptions may define what applications in the "cloud" the person is permitted to use.

As described herein, in one specific example a user account may have associated therewith an indicium that is unique, static and never re-used (e.g., for a given multi-tenant environment). For the purposes of this disclosure, the term "never re-used" is a conceptual term used in the context of identifiers. In one example, all identifiers should fall into 3 criteria such as static, unique, and never re-used. Thus, applications can persist a given ID and rely on this ID to link with user data. In one example, if user accounts can be purged, newer user accounts must not use any previous ID. That is, in this example, a given ID should not be recycled, and should be kept as "immortal" as possible.

As described herein, in one specific example a system administrator may add and/or delete tenants (e.g., for a given multi-tenant environment).

As described herein, in one specific example a system administrator may control (e.g., via the "cloud") many user accounts, many user subscriptions and many applications (e.g., for a given multi-tenant environment).

In one embodiment, the various functions described herein may be implemented using the tree structure and object attributes of FIGS. 1 and 2A-2H. In one specific example, all required data may be stored in a subscription object (e.g., used as a place holder since (in this example) it keeps user account, tenant identifier, web space pattern into one single record in the directory services such as LDAP). In one example, applications invoking the reference API will be able to learn the permission, limitation and boundaries for each subscription.

In one embodiment, a method for enabling at least a first user to utilize a multi-tenant computing environment, wherein the multi-tenant computing environment comprises at least a first computing resource associated with a first tenant and a second computing resource associated with a second tenant is provided, the method comprising: assigning, by a processor, a first user account to the first user, wherein the first user account has associated therewith first user account information comprising at least one user account indicium that is unique across the multi-tenant computing environment; linking by the processor, to the first user account, a first subscription, wherein the first subscription has associated therewith first subscription information; linking by the processor, to the first user account, a second subscription, wherein the second subscription has associated therewith second subscription information; receiving from the first user, by the processor, at least the user account indicium in connection with a log-in to the multi-tenant computing environment by the first user; permitting, by the processor, access to the first computing resource for the first user account based upon the log-in with the user account indicium and the first subscription information of the first subscription that is linked to the first user account; and permitting, by the processor, access to the second computing resource for the first user account based upon the log-in with the user account indicium and the second subscription information of the second subscription that is linked to the first user account.

In one example, the linking of the first subscription and the second subscription to the first user account comprises storing data in a database.

In another example, the first computing resource comprises a first web presence and the second computing resource comprises a second web presence.

In another example, the first web presence comprises at least one webpage and the second web presence comprises at least one webpage.

In another example: the first tenant has associated therewith a first namespace; the second tenant has associated therewith a second namespace that is distinct from the first namespace; the first computing resource is in the first namespace; and the second computing resource is in the second namespace.

In another example, after the log-in by the first user, the first user is enabled by the processor to collaborate with at least a second user in connection with access to at least one of the first computing resource and the second computing resource.

In another example, the collaborative access for each of the first user and the second user comprises: (a) file read access; (b) file write access; (c) file create access; or (d) any combination thereof.

In another example: the multi-tenant computing environment further comprises at least a third computing resource associated with a third tenant; and the processor prohibits access to the third computing resource for the first user.

In another embodiment, a computer readable storage medium, tangibly embodying a program of instructions executable by the computer for enabling at least a first user to utilize a multi-tenant computing environment, wherein the multi-tenant computing environment comprises at least a first computing resource associated with a first tenant and a second computing resource associated with a second tenant is provided, the program of instructions, when executing, performing the following steps: assigning a first user account to the first user, wherein the first user account has associated therewith first user account information comprising at least one user account indicium that is unique across the multi-tenant computing environment; linking to the first user account a first subscription, wherein the first subscription has associated therewith first subscription information; linking to the first user account a second subscription, wherein the second subscription has associated therewith second subscription information; receiving from the first user at least the user account indicium in connection with a log-in to the multi-tenant computing environment by the first user; permitting access to the first computing resource for the first user account based upon the log-in with the user account indicium and the first subscription information of the first subscription that is linked to the first user account; and permitting access to the second computing resource for the first user account based upon the log-in with the user account indicium and the second subscription information of the second subscription that is linked to the first user account.

In one example, the linking of the first subscription and the second subscription to the first user account comprises storing data in a database.

In another example, the first computing resource comprises a first web presence and the second computing resource comprises a second web presence.

In another example, the first web presence comprises at least one webpage and the second web presence comprises at least one webpage.

In another example: the first tenant has associated therewith a first namespace; the second tenant has associated therewith a second namespace that is distinct from the first namespace; the first computing resource is in the first namespace; and the second computing resource is in the second namespace.

In another example, after the log-in by the first user, the first user is enabled to collaborate with at least a second user in connection with access to at least one of the first computing resource and the second computing resource.

In another example, the collaborative access for each of the first user and the second user comprises: (a) file read access; (b) file write access; (c) file create access; or (d) any combination thereof.

In another example: the multi-tenant computing environment further comprises at least a third computing resource associated with a third tenant; and the program of instructions, when executing, prohibiting access to the third computing resource for the first user.

In another embodiment, a system for enabling at least a first user to utilize a multi-tenant computing environment, wherein the multi-tenant computing environment comprises at least a first computing resource associated with a first tenant and a second computing resource associated with a second tenant is provided, the system comprising: an assigning element configured to assign a first user account to the first user, wherein the first user account has associated therewith first user account information comprising at least one user account indicium that is unique across the multi-tenant computing environment; a first linking element configured to link, to the first user account, a first subscription, wherein the first subscription has associated therewith first subscription information; a second linking element configured to link, to the first user account, a second subscription, wherein the second subscription has associated therewith second subscription information; a receiving element configured to receive from the first user at least the user account indicium in connection with a log-in to the multi-tenant computing environment by the first user; a first permitting element configured to permit access to the first computing resource for the first user account based upon the log-in with the user account indicium and the first subscription information of the first subscription that is linked to the first user account; and a second permitting element configured to permit access to the second computing resource for the first user account based upon the log-in with the user account indicium and the second subscription information of the second subscription that is linked to the first user account.

In one example, the system further comprises a database that stores data to link the first subscription and the second subscription to the first user account.

In another example, the first computing resource comprises a first web presence and the second computing resource comprises a second web presence.

In another example, the first web presence comprises at least one webpage and the second web presence comprises at least one webpage.

In another example: the first tenant has associated therewith a first namespace; the second tenant has associated therewith a second namespace that is distinct from the first namespace; the first computing resource is in the first namespace; and the second computing resource is in the second namespace.

In another example, the system further comprises a collaborating element configured to enable, after the log-in by the first user, collaboration by the first user with at least a second user in connection with access to at least one of the first computing resource and the second computing resource.

In another example, the collaborative access for each of the first user and the second user comprises: (a) file read access; (b) file write access; (c) file create access; or (d) any combination thereof.

In another example, the multi-tenant computing environment further comprises at least a third computing resource associated with a third tenant; and the system further comprises a prohibiting element configured to prohibit access to the third computing resource for the first user.

In other examples, any steps described herein may be carried out in any appropriate desired order.

In other embodiments, one or more of the following may be provided: (a) functionality to enable a first user associated with a first tenant to invite a second user associated with a second tenant (wherein the second tenant is different from the first tenant) to collaborate on a resource (e.g., a computing resource) in the space of the first tenant (e.g., in the web presence of the first tenant); (b) functionality to maintain role information on a user's tenant subscription that limits capabilities while operating in that tenant space (e.g., in the web presence of the tenant); (c) functionality to limit access to all of a user's "secondary subscriptions" when the user's "primary subscription" is deleted or otherwise invalidated; (d) functionality to disable only one subscription from a set of subscriptions; and/or (e) functionality to enable organization owners (e.g., tenants) to limit which "secondary subscriptions" a user can join based on rules in the "primary subscription" space of the user.

As described herein, mechanisms are provided to allow invited users to retain a single identity across all organizations (that is, tenants) in a multi-tenant environment. That is, a given user's organizational identity may be brought into a multi-tenant environment (wherein such organizational identity may be managed under an organizational management scope).

As described herein mechanisms are provided to maintain a single identity when collaborating across multiple organization boundaries. In one example, this is accomplished by taking advantage of SSO.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for enabling at least a first user to utilize a multi-tenant computing environment, wherein the multi-tenant computing environment comprises at least a first computing resource associated with a first tenant and a second computing resource associated with a second tenant, the method comprising:
   assigning, by a processor, a first user account to the first user, wherein the first user account has associated therewith first user account information comprising at least one user account indicium that is unique across the multi-tenant computing environment;
   linking by the processor, to the first user account, a first subscription, wherein the first subscription has associated therewith first subscription information;
   linking by the processor, to the first user account, a second subscription, wherein the second subscription has associated therewith second subscription information;
   receiving from the first user, by the processor, at least the user account indicium in connection with a log-in to the multi-tenant computing environment by the first user;
   permitting, by the processor, access to the first computing resource for the first user account based upon the log-in with the user account indicium and the first subscription information of the first subscription that is linked to the first user account; and
   permitting, by the processor, access to the second computing resource for the first user account based upon the log-in with the user account indicium and the second subscription information of the second subscription that is linked to the first user account;
   wherein a list of subscriptions for the first user account determines whether the first user account can move among different tenants;
   wherein, in the event of inactivation of the first user account, the first subscription cannot be used to access the first computing resource and the second subscription cannot be used to access the second computing resource;
   wherein, in the event of reactivation of the first user account after being deactivated, all user application data will again be available to the first user account; and
   wherein, in the event of termination of the first user account, all user application data will be deleted.

2. The method of claim 1, wherein the linking of the first subscription and the second subscription to the first user account comprises storing data in a database.

3. The method of claim 1, wherein the first computing resource comprises a first web presence and the second computing resource comprises a second web presence.

4. The method of claim 3, wherein the first web presence comprises at least one webpage and the second web presence comprises at least one webpage.

5. The method of claim 1, wherein:
   the first tenant has associated therewith a first namespace;
   the second tenant has associated therewith a second namespace that is distinct from the first namespace;
   the first computing resource is in the first namespace; and
   the second computing resource is in the second namespace.

6. The method of claim 1, wherein after the log-in by the first user, the first user is enabled by the processor to collaborate with at least a second user in connection with access to at least one of the first computing resource and the second computing resource.

7. The method of claim 6, wherein the collaborative access for each of the first user and the second user comprises: (a) file read access; (b) file write access; (c) file create access; or (d) any combination thereof.

8. The method of claim 1, further comprising at least one of:
   (a) enabling by the processor the first user associated with the first tenant to invite a second user associated with the second tenant to collaborate on a computing resource associated with the first tenant;
   (b) maintaining by the processor role information on the first subscription of the first user that limits capabilities while accessing the first computing resource;
   (c) limiting by the processor access to all of a plurality of secondary subscriptions of the first user when a primary subscription of the first user is deleted or otherwise invalidated;
   (d) disabling by the processor only one subscription of the first user from a set of subscriptions of the first user;
   (e) enabling by the processor a tenant to limit which of a plurality of secondary subscriptions the first user can join based on rules associated with a primary subscription of the first user; or
   (f) any combination thereof.

9. The method of claim 1, wherein:
   the multi-tenant computing environment further comprises at least a third computing resource associated with a third tenant; and
   the method further comprises prohibiting access to the third computing resource for the first user.

10. The method of claim 1, wherein the at least one user account indicium of the first user account is further static and never re-used for the multi-tenant computing environment.

* * * * *